(12) United States Patent
Kim et al.

(10) Patent No.: US 10,587,656 B2
(45) Date of Patent: Mar. 10, 2020

(54) METHOD FOR SELECTING P-CSCF AND TRANSMITTING SIP MESSAGE IN WIRELESS COMMUNICATION SYSTEM AND DEVICE FOR SAME

(71) Applicant: LG ELECTRONICS INC., Seoul (KR)

(72) Inventors: Laeyoung Kim, Seoul (KR); Sungduck Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 39 days.

(21) Appl. No.: 15/751,290

(22) PCT Filed: Aug. 9, 2016

(86) PCT No.: PCT/KR2016/008748
§ 371 (c)(1),
(2) Date: Feb. 8, 2018

(87) PCT Pub. No.: WO2017/026772
PCT Pub. Date: Feb. 16, 2017

(65) Prior Publication Data
US 2018/0234465 A1 Aug. 16, 2018

Related U.S. Application Data

(60) Provisional application No. 62/202,893, filed on Aug. 9, 2015.

(51) Int. Cl.
*H04L 29/06* (2006.01)
*H04L 29/12* (2006.01)
(Continued)

(52) U.S. Cl.
CPC ...... *H04L 65/1006* (2013.01); *H04L 61/2015* (2013.01); *H04L 65/105* (2013.01);
(Continued)

(58) Field of Classification Search
CPC .. H04W 40/00; H04W 40/22; H04L 65/1016; H04L 65/1006; H04L 65/1073;
(Continued)

(56) References Cited

U.S. PATENT DOCUMENTS

2017/0041752 A1* 2/2017 Baek ............... H04W 4/023
2017/0317740 A1* 11/2017 Basu Mallick .... H04B 7/15557

FOREIGN PATENT DOCUMENTS

KR 10-2014-0115067 A 9/2014
KR 10-2015-0076276 A 7/2015
(Continued)

OTHER PUBLICATIONS

3GPP, "3rd Generation Partnership Project; Technical Specification Group Core Network and Terminals; IP Multimedia call control protocol based on Session Initiation Protocol (SIP) and Session Description Protocol (SDP); Stage 3 (Release 13)", 3GPP TS 24.229 V13.2.1 Jun. 2015, pp. 1-891.

*Primary Examiner* — Jae Y Lee
*Assistant Examiner* — Aixa A Guadalupe Cruz
(74) *Attorney, Agent, or Firm* — Birch, Stewart, Kolasch & Birch, LLP

(57) ABSTRACT

A method for transmitting a session initiation protocol (SIP) message by a user equipment (UE) in a wireless communication system, according to an embodiment of the present invention, comprises the steps of: establishing connection with a UE-to-network relay; and transmitting an SIP message to a proxy call session control function (P-CSCF) by means of the relay, wherein the P-CSCF corresponds to a P-CSCF address obtained by means of the UE-to-network relay or a P-CSCF address stored in the UE.

7 Claims, 9 Drawing Sheets

(51) Int. Cl.
*H04W 80/10* (2009.01)
*H04W 4/90* (2018.01)
*H04W 76/45* (2018.01)
*H04W 4/10* (2009.01)
*H04W 12/06* (2009.01)
*H04W 40/22* (2009.01)
*H04W 88/04* (2009.01)

(52) U.S. Cl.
CPC ...... *H04L 65/1016* (2013.01); *H04L 65/1073* (2013.01); *H04W 4/10* (2013.01); *H04W 4/90* (2018.02); *H04W 12/06* (2013.01); *H04W 40/22* (2013.01); *H04W 76/45* (2018.02); *H04W 80/10* (2013.01); *H04W 88/04* (2013.01)

(58) Field of Classification Search
CPC ............. H04L 65/4061; H04L 65/1013; H04L 65/1046; H04L 61/2015; H04L 61/2061; H04L 61/2076
See application file for complete search history.

(56) References Cited

FOREIGN PATENT DOCUMENTS

KR     10-2014-0128972 A     11/2016
WO    WO 2014/142570 A1    9/2014

\* cited by examiner

METHOD FOR SELECTING P-CSCF AND TRANSMITTING SIP MESSAGE IN WIRELESS COMMUNICATION SYSTEM AND DEVICE FOR SAME

CROSS REFERENCE TO RELATED APPLICATIONS

This application is the National Phase of PCT international Application No. PCT/KR2016/008748, filed on Aug. 9, 2016, which claims priority under 35 U.S.C. 119(e) to U.S. Provisional Application No. 62/202,893, filed on Aug. 9, 2015, all of which are hereby expressly incorporated by reference into the present application.

TECHNICAL FIELD

The following description relates to a wireless communication system, and more particularly, to a method and device for selecting P-CSCF and transmitting an SIP message.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to provide P-CSCF to which SIM message should be transmitted when a UE establishes connection to UE-to-Network relay.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for transmitting a session initiation protocol (SIP) message by a user equipment (UE) in a wireless communication system comprises the steps of establishing connection with a UE-to-network relay; and transmitting the SIP message to a proxy call session control function (P-CSCF) through the relay, wherein the P-CSCF corresponds to a P-CSCF address acquired through the UE-to-network relay or a P-CSCF address stored in the UE.

In one embodiment of the present invention, a user equipment (UE) for transmitting a session initiation protocol (SIP) message in a wireless communication system comprises a transceiving module; and a processor, wherein the processor establishes connection with a UE-to-network relay and transmits the SIP message to a proxy call session control function (P-CSCF) through the relay, and the P-CSCF corresponds to a P-CSCF address acquired through the UE-to-network relay or a P-CSCF address stored in the UE.

The P-CSCF address may be received through a discovery message.

The P-CSCF address may be received through a DHCP (Dynamic Host Configuration Protocol) message if the UE-to-UE Relay performs a function of the DHCP server.

The DHCP message may be a DHCI offer or DHCP ack.

The P-CSCF address may be P-CSCF of a home network of the UE-to-UE Relay if the UE-to-UE Relay performs PDN connection in HR (Home-Routed) mode, and may be P-CSCF of a visited network of the UE-to-UE Relay if the UE-to-UE Relay forms PDN connection in LBO (Local Breakout) mode.

The P-CSCF address stored in the UE may be the address used before the UE establishes connection with the UE-to-UE Relay.

The P-CSCF address stored in the UE may be the address pre-configured for the UE before the UE establishes connection with the UE-to-UE Relay.

The UE may use the P-CSCF address acquired from the UE-to-UE Relay if PLMN prior to connection with the UE-to-UE Relay is different from PLMN of the UE-to-UE Relay.

The method may further comprise the steps of receiving ECGI from the UE-to-UE Relay; and comparing PLMN ID prior to connection with the UE-to-UE Relay with PLMN ID of the UE-to-UE Relay, which is identified by the ECGI.

The UE may use the P-CSCF address stored therein if PLMN prior to connection with the UE-to-UE Relay is the same as PLMN of the UE-to-UE Relay.

The P-CSCF address may be one of IPv4 address, IPv6 address and FQDN (Fully Qualified Domain Name).

The SIP message may be SIP register message.

Advantageous Effects

According to the present invention, it is possible to solve ambiguity as to P-CSCF to which SIM message should be transmitted when a UE establishes connection to UE-to-Network relay.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
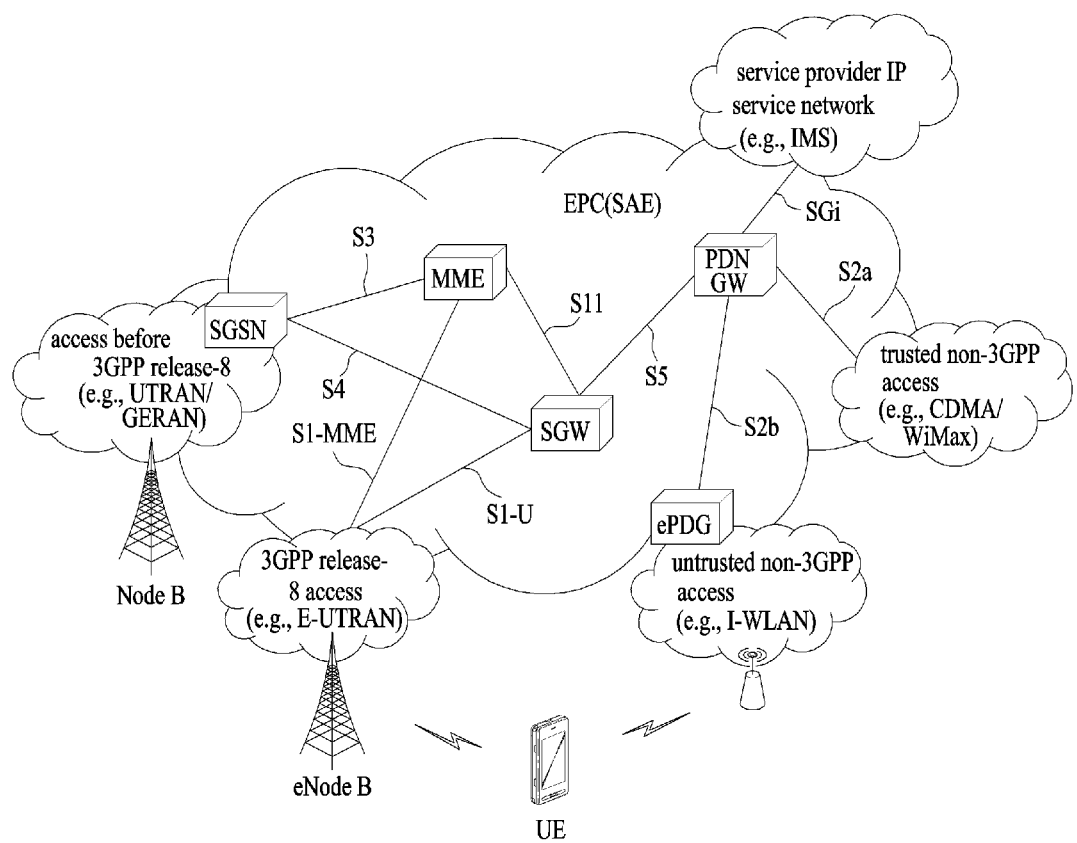
FIG. 1 is a diagram illustrating a brief structure of an EPS (evolved packet system) that includes an EPC (evolved packet core)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC (SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: Group communication service providing capability capable of processing fast configuration time and massive group, robust security, and priority handling.

MCPTT service: provides fast configuration time, high availability and reliability, and priority handling using Push To Talk communication supporting applications for mission critical organizations and mission critical applications for organizations (e.g., utilities, railways) with other business.

Mission Critical Organization: includes end-user organization including MCPTT users and UEs and MCPTT administrators. The mission critical organization can be hierarchically organized with an administrative control delegated to the organization or an external entity.

MCPTT system: A set of applications, services, and enabling capabilities required to support Mission Critical Push To Talk for Mission Critical Organization.

MCPTT user: A user of MCPTT service. A user having a device (i.e., UE) capable of participating in MCPTT service.

MCPTT Group: A set of MCPTT users capable of being identified irrespective of (independently) transport or network type.

MCPTT Group Member: MCPTT user authorized for participating in group communication of a specific MCPTT group.

Group call: A mechanism that enables MCPTT user to make other users corresponding to members of MCPTT group(s) perform one-to-many MCPTT transmission.

Group affiliation: A mechanism that makes MCPTT user determine to be interested in one or more MCPTT groups.

Affiliated MCPTT Group Member: MCTPP group member ready to receive group communication from corresponding MCTPP group and/or perform transmission to corresponding MCPTT group by showing interest to a certain MCTPP group.

Late call entry: Join MCPTT Group Call in which Affiliated MCPTT Group Member is in progress.

Floor control: Arbitrating system in MCPTT service that determines who has authority for performing transmission (talk) at certain timing while MCPTT call is in progress.

Besides, for MCPTT-related terminologies, it may refer to Definitions of the paragraph 3.1 of 3GPP TS 22.179 and Definitions of the paragraph 3.1 of TS 23.179.

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
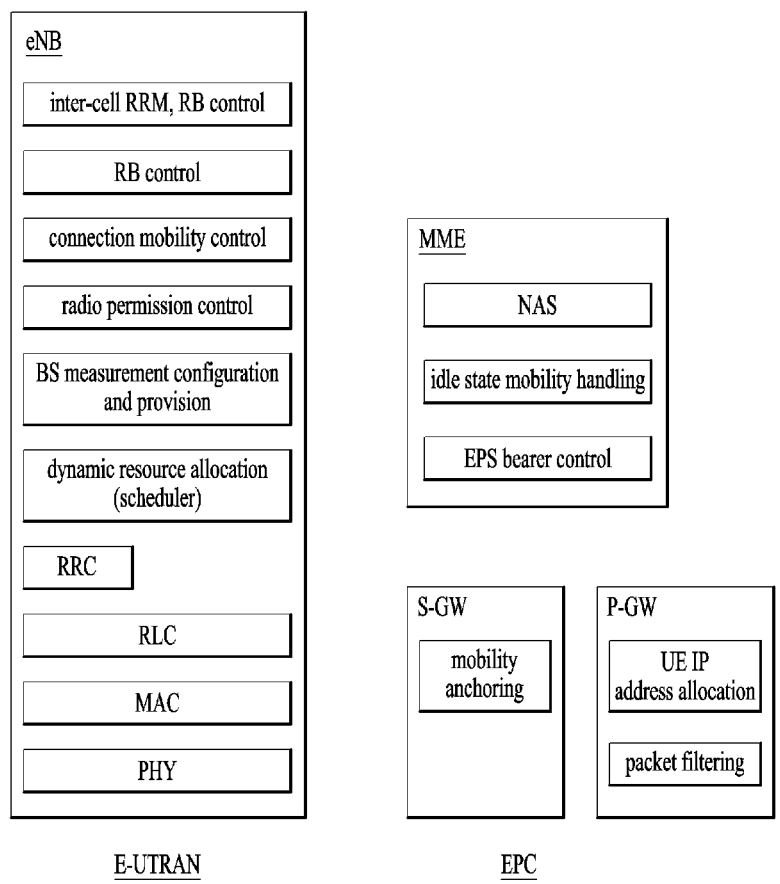
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
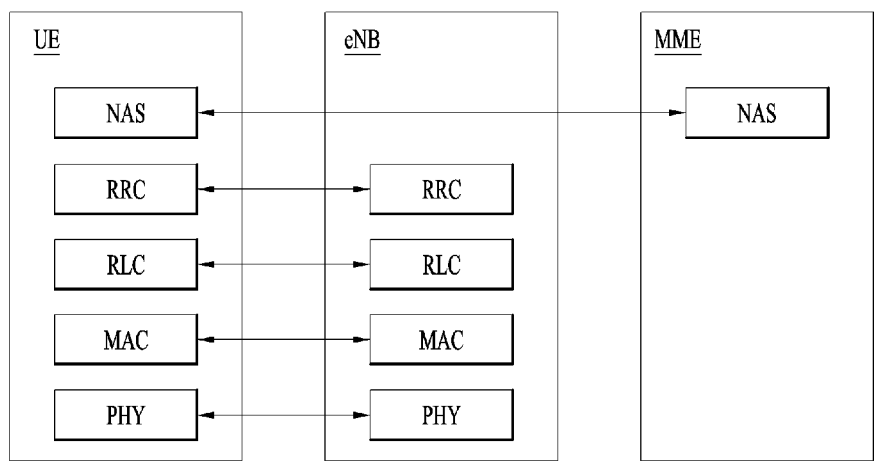
FIG. 3 is an exemplary diagram illustrating a structure of a radio interface protocol on a control plane.
Figure 4:
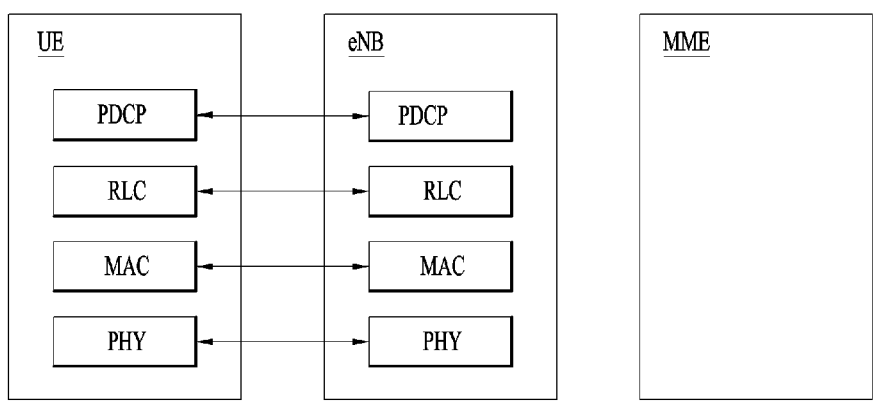
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
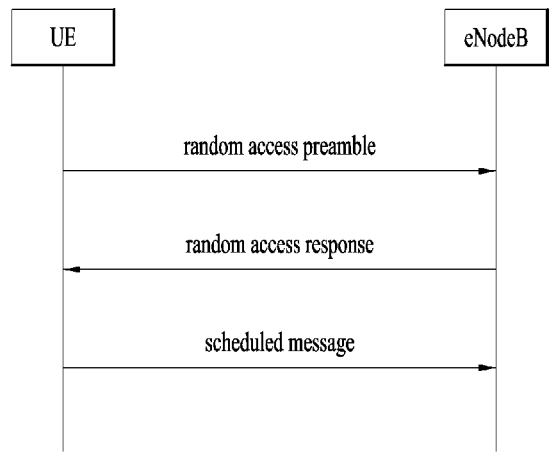
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
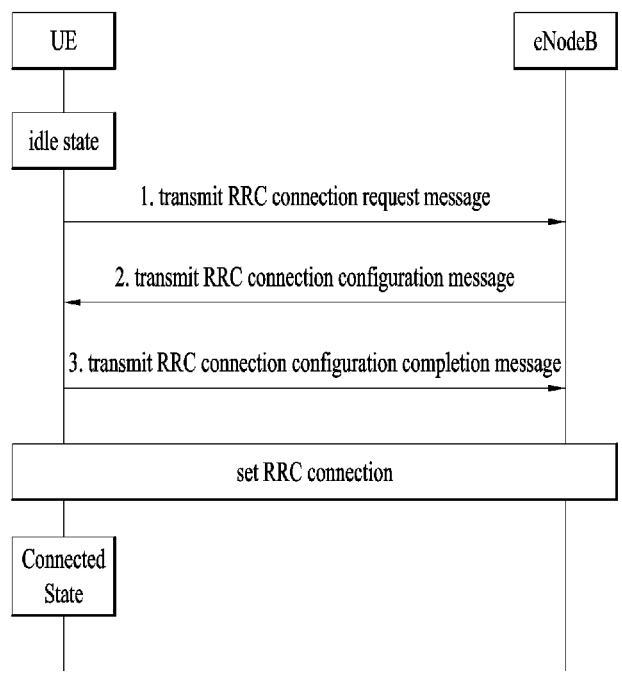
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

MCPTT (Mission Critical Push to Talk)

MCPTT is a technology for allowing PTT (Push to Talk) to be available in an LTE network in case of a status such as disaster. MCPTT service may be categorized into an on-network mode (or on-network operation mode or on-network use or on-network MCPTT service) and an off-network mode (or off-network operation mode or off-network use or off-network MCPTT service).

On-network MCPTT service is MCPTT service where communication is performed through a network infrastructure, and includes a case that a UE performs communication through the network infrastructure within a network coverage (that is, while being served by E-UTRAN) and a case that the UE performs communication through the network infrastructure through a UE-to-Network Relay while being outside the network coverage (that is, while not being served by E-UTRAN).

Off-Network MCPTT Service is provided using ProSe discovery and ProSe communication path. Although the off-network MCPTT service may be used when the UE is outside the network coverage, the off-network MCPTT service may be used even when the UE is within the network coverage.

Figure 7:
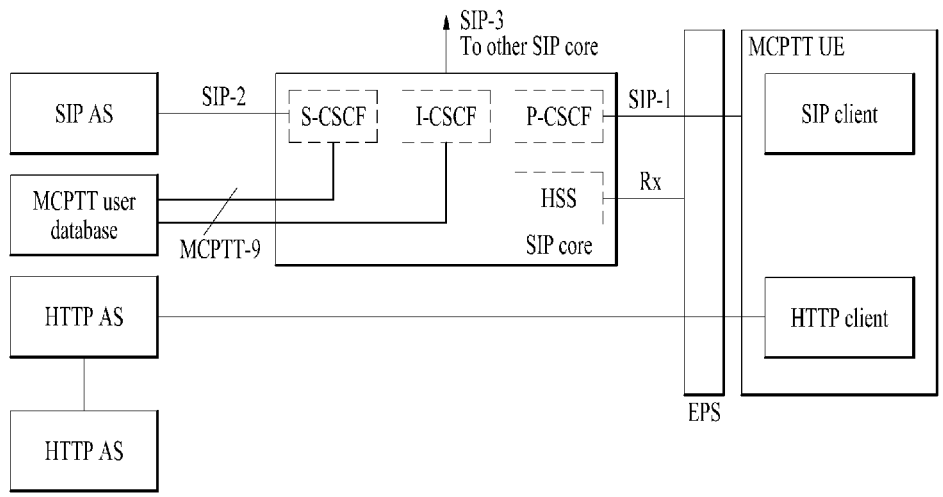
FIGS. 7 to 10 are diagrams illustrating MCPTT.

A function model for a signaling plane in MCPTT is illustrated in FIG. 7. An MCPTT UE transmits and receives signaling to and from SIP core to receive MCPTT service as illustrated in FIG. 7. Particularly, according to clause 7.5.3.2 of TS 23.179v0.2.0, Gm interface defined in 3GPP IMS is used as SIP-1 interface. The SIP-1 interface may be used for i) IP registration, ii) authentication and security to the service layer, iii) event subscription and notification, iv) overload control, v) session management and media negotiation, etc.

Figure 8:
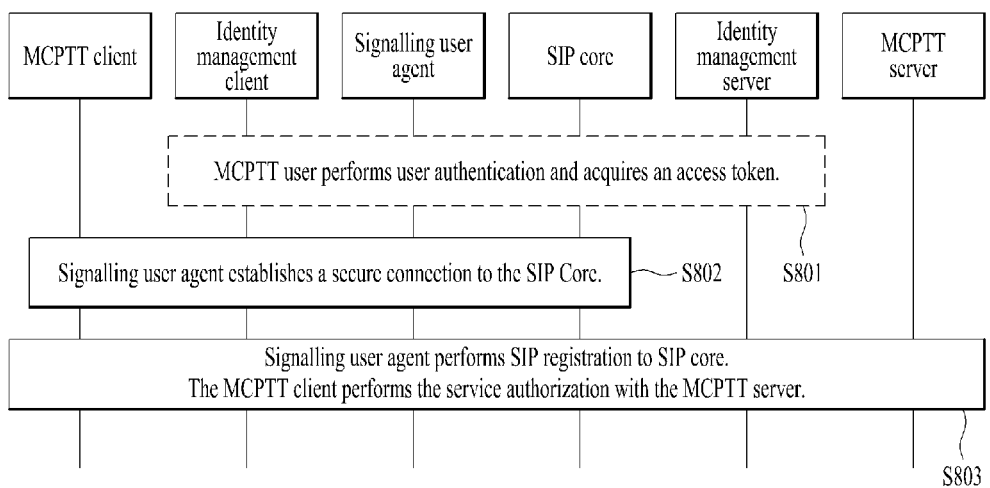

A user authentication and registration procedure for receiving MCPTT service is illustrated in FIG. 8. In step S801, an identity management client initiates a user authentication procedure. An MCPTT user provides his/her user credentials (for example, Biometrics, secureID, username/password) to receive verification from an identity management server. In step S802, a signaling user agent in a UE forms secure connection for SIP level authentication and registration by using SIP core. In step S803, the signaling user agent completes SIP level registration with the SIP core and third-party authorization with MCPTT server. MCPTT client in the UE performs MCPTT service authorization with a user. To this end, the result of the step S801 may be used. The MCPTT client is a functional entity operated as a user agent for all MCPTT application transactions in MCPTT UE.

Figure 9:
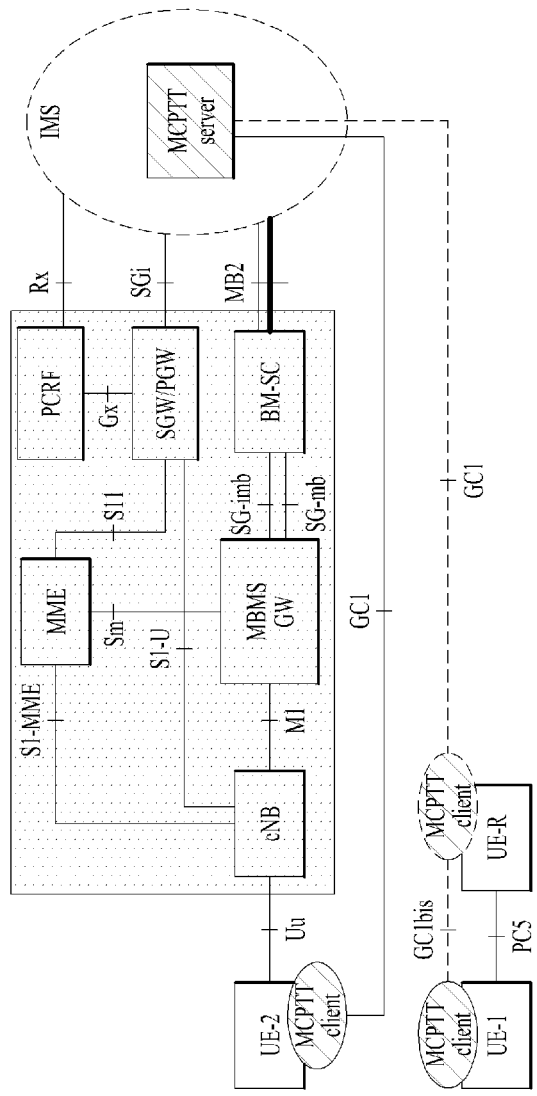

A structure for a Network Mode Operation (NMO) supported by a centralized MCPTT server and a Network Mode Operation via Relay (NMO-R) is illustrated in FIG. 9. UE-2 and UE-R are UEs that may directly be connected with a network, and may perform NMO. On the other hand, UE-1 cannot be connected with the network directly, and may instead perform NMO-R connected to the network through UE-R that performs UE-to-Network Relay. The MCPTT server may support centralized floor control for MCPTT. The other details may be cited/inserted to this specification by clause 5.3 of TR 23.779 V0.4.0 (Solution 3: ALG Relay for MCPTT NMO-R).

Figure 10:
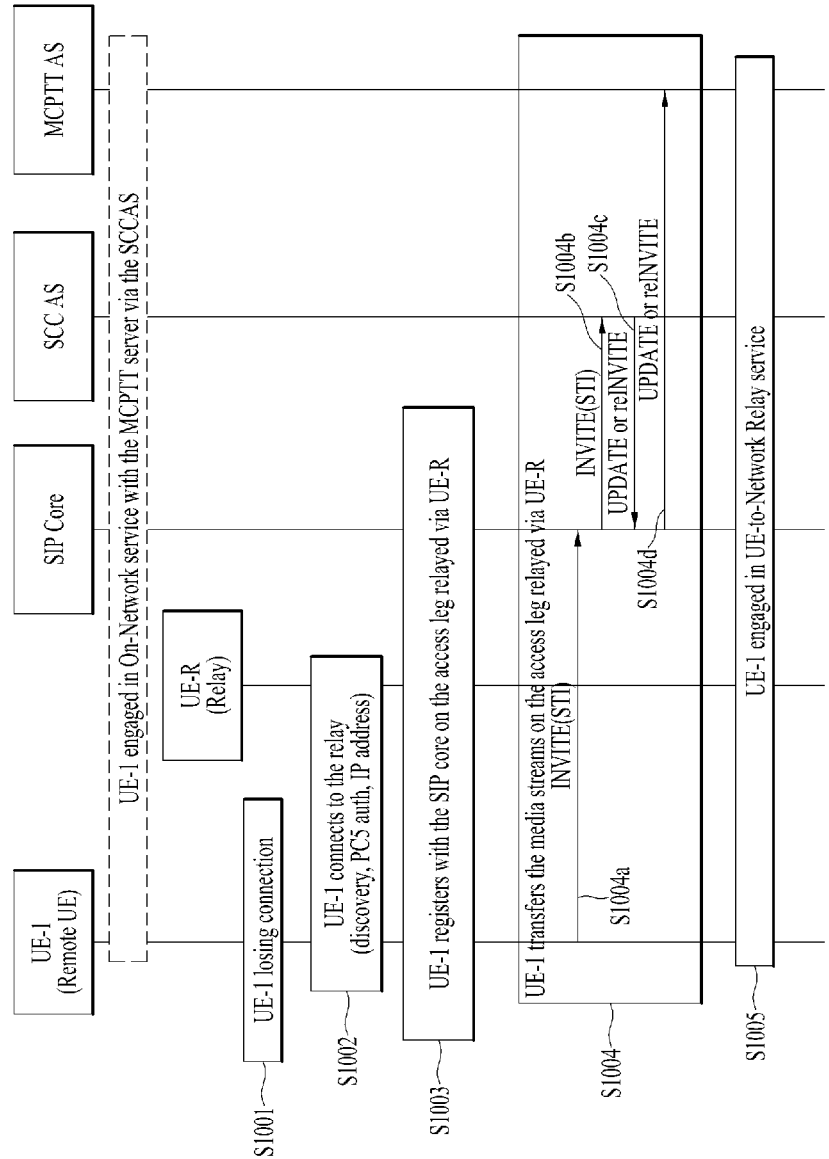

FIG. 10 illustrates a procedure related to service continuity when a UE switches on-network MCPTT service to MCPTT service through UE-to-network relay. Referring to FIG. 10, in step S1000, UE-1 has direct connection with a network, and involves in MCPTT AS and SIP session. The SIP session is anchored to service centralization and continuity application server (SCC AS), and a session transfer identifier (STI) is allocated to the anchored SIP session. In step S1001, UE-1 recognizes that connection with the network is being lost or fully lost. In step S1002, UE-1 performs ProSe UE-to-Network relay discovery on PC5 and establishes secure point-to-point link with a relay (UE-R) on PC5. As a part of this procedure, a remote UE is authenticated with the relay or the network in a PC5 layer (depending on the SA3 decision for security). In this procedure, UE-1 is allocated with IP address/prefix by the relay. In step S1003, UE-1 registers in SIP core on UE-to-network relay leg. In step S1004, to transmit media streams of SIP session, UE-1 transmits INVITE message to SCC AS on a new access leg. This INVITE message includes STI for identifying a session to be transmitted. The SCC AS identifies a session on the basis of STI, and updates the session on a remote access leg. In step S1005, if all media streams are delivered on the access leg relayed through UE-R, the procedure is completed. In this case, if UE-1 still has direct network connection, UE-1 deregisters from on-network leg.

As described above, even though the MCPTT UE becomes a remote UE and is connected to the network through the UE-to-Network Relay, the MCPTT UE should transmit SIP message (SIP registration message, etc.) to the SIP core. In this case, since the UE should transmit the SIP message to P-CSCF (that is, network node connected with UE in IMS network by Gm interface), the UE needs to acquire an address of P-CSCF. This will be disclosed in clause L.2.2.1 of TS 24.229 and related description is as follows.

Prior to communication with IM CN subsystem, a) if the UE is not attached for EPS service, the UE performs EPS attachment procedure of 3GPP TS 24.301, and b) the UE ensures that EPS bearer context according to APN and P-GW selection standard disclosed in 3GPP TS 23.401, which is used for SIP signaling, is available. This EPS bearer context should remain in an active state for a period that the UE is connected with IM CN subsystem.

If EPS bearer context establishment procedure for SIP signaling is initiated by the UE, I. if default EPS bearer context is not available together with the selected P-GW, the UE should indicate that a request of PDN CONNECTIVITY REQUEST is for SIP signaling. If the request is granted, the network should establish a bearer together with proper QCI as disclosed in 3GPP TS 24.301. The UE may use EPS bearer context for DNS and DHCP signaling.

II. If default EPS bearer context is available together with the selected P-GW and may be used for SIP signaling, additional step is not required.

III. If default EPS bearer context is available together with the selected P-GW and EPS bearer having proper QCI and TFT should be established for SIP signaling, the UE should indicate, to the network, that a request of BEARER RESOURCE ALLOCATION REQUEST message is for SIP signaling by setting IM CN subsystem signaling flag of a protocol Configuration Options information element in the BEARER RESOURCE ALLOCATION REQUEST message. If the request is granted, the network establishes a new dedicated bearer or corrects a current bearer together with proper CQI and TFT.

c) P-CSCF address is obtained.

A method for P-CSCF discovery is as follows.

I. If IPv4 is used, Dynamic Host Configuration Protocol (DHCP) RFC 2132, DHCPv4 options for SIP servers RFC 3361, and RFC 3263 are introduced. If IPv6 is used, Dynamic Host Configuration Protocol for IPv6 (DHCPv6) RFC 3315, DHCPv6 options for SIP servers RFC 3319 and DHCPv6 options for Domain Name Servers (DNS) RFC 3646 are introduced.

II. A method for sending P-CSCF address in an EPS bearer context activity procedure is as follows. The UE should indicate a request for P-CSCF in a Protocol Configuration Options information element of PDN CONNECTIVITY REQUEST message or BEARER RESOURCE ALLOCATION REQUEST message. If the network provides the UE of a list of P-CSCF IPv4 or IPv6 addresses in ACTIVATE DEFAULT EPS BEARER CONTEXT REQUEST message or ACTIVATE DEDICATED EPS BEARER CONTEXT REQUEST message, the UE should assume that the addresses are aligned in top-down mode from the first P-CSCF address which is the P-CSCF address of the highest preference in a Protocol Configuration Options information element to the last P-CSCF address which is the P-CSCF address of the lowest preference.

III. The UE selects P-CSCF from the list stored in ISIM.

IV. The UE selects P-CSCF from the list in IMS management object.

If P-CSCF should be discovered in a home network, the UE is roaming and the IMS management object includes P-CSCF, the method IV should be used for P-CSCF selection.

If P-CSCF should be discovered in the home network, the UE is roaming and does not include the IMS management object or the UE includes IMS management object but the IMS management object does not include P-CSCF list, and ISIM in UICC supports the P-CSCF list, the method III should be used for P-CSCF selection.

If the UE is in the home network or is roaming and P-CSCF should be discovered by a visited network, the UE may select the method I or II for P-CSCF discovery. If the UE is in the home network and P-CSCF has a list, the UE may select the method VI for P-CSCF discovery.

In addition, details related to P-CSCF discovery refer to clause 9.2.1 or L.2.2.1 of TS 24.229.

As described above, the UE may acquire P-CSCF address, and if the UE is connected to the network through the UE-to-Network Relay, there is no definition as to how the P-CSCF address is acquired and/or which P-CSCF address should be used to transmit SIP message to the network.

Figure 11:
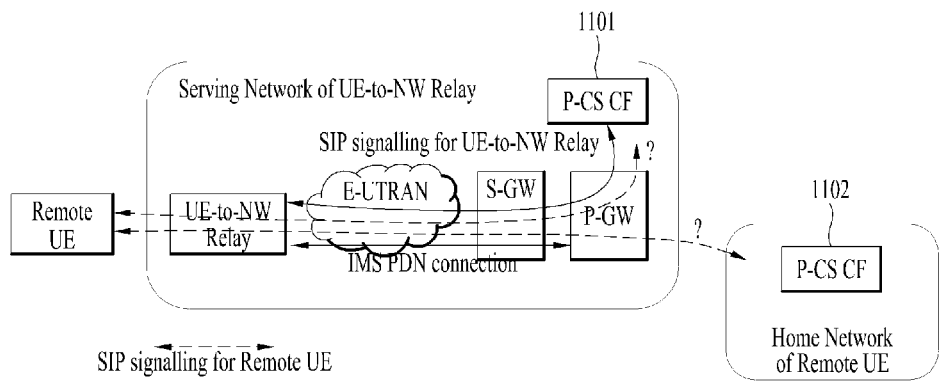
FIGS. 11 and 12 are diagrams illustrating problems in P-CSCF selection.
Figure 12:
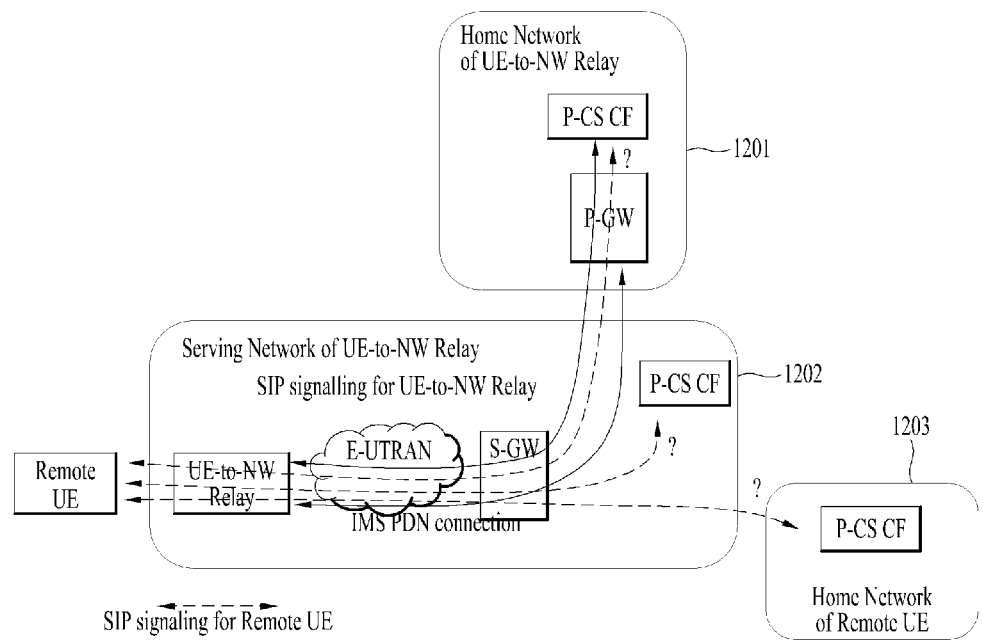

In more detail, as illustrated in FIG. 11, if the UE-to-Network Relay is not roaming, the UE-to-Network Relay contacts P-CSCF 1101 of a Home PLMN. However, it is not certain whether a remote UE that establishes direct communication connection with the UE-to-Network Relay should transmit SIP message to P-CSCF 1102 prior to direct communication connection or the P-CSCF 1101 of the UE-to-Network Relay. Also, as illustrated in FIG. 12, this ambiguity exists even in case that the UE-to-Network Relay is loaming. If the UE-to-Network Relay forms PDN connection for IMS in HR (Home-Routed) mode, the UE-to-Network Relay transmits the SIP message to P-CSCF 1201 of the Home PLMN. If PDN connection is formed in LBO (Local BreakOut) mode, the UE-to-Network Relay contacts P-CSCF 1202 of a visited PLMN. It is not certain whether the remote UE that establishes direct communication connection with the UE-to-Network Relay should transmit the SIP message to the P-CSCF 1202 of the visited PLMN or P-CSCF 1203 of its home PLMN prior to direct communication connection. Therefore, a description as to P-CSCF to which the UE should transmit the SIP message when the UE establishes direct communication connection with the UE-to-Network Relay will be given. In the following description, the P-CSCF is a network node in SIP core, and may be replaced with a node connected with the UE by Gm interface or a node that transmits and receives the SIP message (or control message or signaling) to and from the UE.

The UE (remote UE) that establishes connection with the UE-to-Network Relay may transmit the SIP message to the P-CSCF (Proxy Call Session Control Function) through a relay. In this case, the P-CSCF may correspond to any one of the P-CSCF address acquired from the UE-to-Network Relay or the P-CSCF address stored in the UE. Hereinafter, the P-CSCF will be described in more detail.

As a first embodiment, the P-CSCF address stored in the UE may be used before the UE establishes connection with the UE-to-network relay, or may be pre-configured for the UE before the UE establishes connection with the UE-to-network relay. That is, the P-CSCF to which the UE transmits the SIP message may be the P-CSCF address stored in the UE. That is, even though the remote UE is connected with the UE-to-Network Relay, if there is the legacy P-CSCF address, the remote UE maintains the legacy P-CSCF address. That is, if there is the P-CSCF address used when the remote UE is directly connected with the network and receives a service, the remote UE maintains the P-CSCF address and/or uses the P-CSCF address as it is. Alternatively, if the remote UE which is in coverage (that is, served by the E-UTRAN) is out of coverage (that is, not served by the E-UTRAN), the remote UE continues to use the P-CSCF address used in coverage. This considers that the UE is likely to belong to the same PLMN even though the UE establishes connection with the UE-to-network relay. In this case, signaling overhead according to acquisition of the P-CSCF address may be reduced. If the P-CSCF address used by the remote UE is not proper, the UE-to-network relay may change the P-CSCF address to a proper P-CSCF address. This is available in such a manner that the UE-to-Network Relay provides a proper P-CSCF address to the remote UE if the UE-to-Network Relay identifies a destination IP address of the SIP message, that is, P-CSCF address, which is transmitted from the remote UE, and determines that the address is not proper.

As a second embodiment, P-CSCF to which the UE connected with the UE-to-Network Relay transmits the SIP message may correspond to the P-CSCF address acquired (from the UE-to-Network Relay) through the UE-to-network relay. That is, the P-CSCF address may be provided by the UE-to-network relay. As a detailed example, the P-CSCF address may be received through a discovery message. That is, the P-CSCF address may be provided through a discovery related message during UE-to-Network Relay discovery operation. Alternatively, the P-CSCF address may be provided for an operation (that is, operation for forming one-to-one direct communication) that the remote UE and the UE-to-Network Relay establish Layer 2 link.

Alternatively, if the UE-to-network relay performs a function of a DHCP (Dynamic Host Configuration Protocol) server, the P-CSCF address may be received through a DHCP message (DHCP offer or DHCP ack). That is, the UE-to-Network Relay may serve as a DHCP server and provide the P-CSCF address through a DHCP operation. The P-CSCF address provided to the remote UE may be acquired by the UE-to-Network Relay in the same method disclosed in clause L.2.2.1 of TS 24.229, or may be configured to be provided to the remote UE. In respect of this configuration, one P-CSCF address may be configured, or the configuration may be made in the form of service (for example, Relay Service Code information provided by the UE-to-Network Relay during direct discovery)), which may be provided by the UE-to-Network Relay, and/or association with the UE-to-Network Relay and/or Layer-2 ID of the UE-to-Network Relay. In addition, the P-CSCF address may be configured in the form of association with properties (for example, MCPTT group to which the remote UE belongs, application domain information of the remote UE, etc.) of the remote UE. Alternatively, the P-CSCF address may be acquired by the UE-to-Network Relay from the network for/on behalf of the remote UE.

The P-CSCF address acquired from UE-to-network relay may be the P-CSCF address used by the UE-to-Network Relay. Therefore, if the UE-to-Network Relay forms PDN connection in HR(Home-Routed) mode, the P-CSCF address may be P-CSCF of a home network of the UE-to-network relay, and if the UE-to-Network Relay forms PDN connection in LBO (Local BreakOut) mode, the P-CSCF address may be P-CSCF of a visited network of the UE-to-Network Relay.

Since the remote UE receives a network connection service by using IMS PDN connection of the UE-to-Network Relay without generating separate IMS PDN connection, it is preferable that the remote UE accesses the P-CSCF address accessed by the UE-to-Network Relay. For this reason, the P-CSCF address provided by the UE-to-Network Relay is used.

As a third embodiment, the UE may determine a P-CSCF address, which will be used, depending on whether PLMN is changed by establishing connection with the UE-to-Network Relay. The UE may receive ECGI broadcast from the UE-to-Network Relay (see Cell ID announcement procedure in clause 5.4.4.5 of TS 23.303) and compare PLMN ID prior to connection with the UE-to-network relay with PLMN ID of the UE-to-network relay, which is identified from ECGI.

If PLMN prior to connection with the UE-to-network relay is different from PLMN of the UE-to-network relay, the UE may use the P-CSCF address acquired from the UE-to-network relay. That is, if serving PLMN in coverage (or prior to service from the relay) is different from serving PLMN of the UE-to-Network Relay, the remote UE may use the P-CSCF address transmitted from the UE-to-Network Relay. As a method for acquiring the P-CSCF address from the UE-to-Network Relay, the disclosure in the second embodiment may be used.

If PLMN prior to connection with the UE-to-network relay is the same as PLMN of the UE-to-network relay, the UE may use the P-CSCF address stored in the UE. In other words, if serving PLMN in coverage (or prior to service from the relay) is the same as serving PLMN of the UE-to-Network Relay, the remote UE continues to use the P-CSCF address used in coverage (or prior to service from the relay) even after receiving a network connection service from the UE-to-Network Relay. In this case, since the UE does not need to receive the P-CSCF address from the UE-to-Network Relay separately, waste of PC5 radio resource may be removed.

As a fourth embodiment, P-CSCF address which may be used during network connection through the UE-to-Network Relay is configured for the UE.

At this time, one P-CSCF address may be configured, or the configuration may be made in the form of service (for example, Relay Service Code information provided by the UE-to-Network Relay during direct discovery), which may be provided by the UE-to-Network Relay, and/or association with the UE-to-Network Relay and/or Layer-2 ID of the UE-to-Network Relay.

Alternatively, the P-CSCF address may be configured in the form of association with PLMN to which the P-CSCF contacted by the UE-to-Network Relay to receive IMS service belongs. Typically, PLMN to which the P-CSCF contacted by the UE through Gm interface belongs is HPLMN subscribed by the UE when PDN connection for IMS is formed in HR (Home-Routed) mode, and is serving PLMN of the UE when PDN connection for IMS is formed in LBO (Local BreakOut) mode. Therefore, the UE-to-Network Relay may provide the remote UE with information of PLMN to which the P-CSCF belongs, and the remote UE may use the address of the P-CSCF associated with the PLMN. The UE-to-Network Relay may be configured to identify HR mode or LBO mode used to form PDN connection for IMS in its serving PLMN, or the information may be acquired from the network.

As another example, the information may be acquired by the remote UE from the network after the remote UE starts to receive a network service from the UE-to-Network Relay.

In addition to the various methods described as above, as a method for acquiring P-CSCF address used by the remote UE, II (acquisition of P-CSCF through EPS bearer context activity procedure) of the methods for acquiring P-CSCF address described in clause L.2.2.1 of TS 24.229 may be used.

The P-CSCF address may be one of IPv4 address, IPv6 address and FQDN (Fully Qualified Domain Name). The SIP message may be SIP register message. Also, although the aforementioned description has been made based on the address of the network node that receives the SIP message from the UE when the SIP message is transmitted to the SIP core, the description may be applied to the address of the network node that receives another control message (signal) when the UE should transmit the another control message to the network node as the remote UE. In the aforementioned description, the configuration may mean pre-configuration and/or configuration/change in the network (if necessary).

Figure 13:
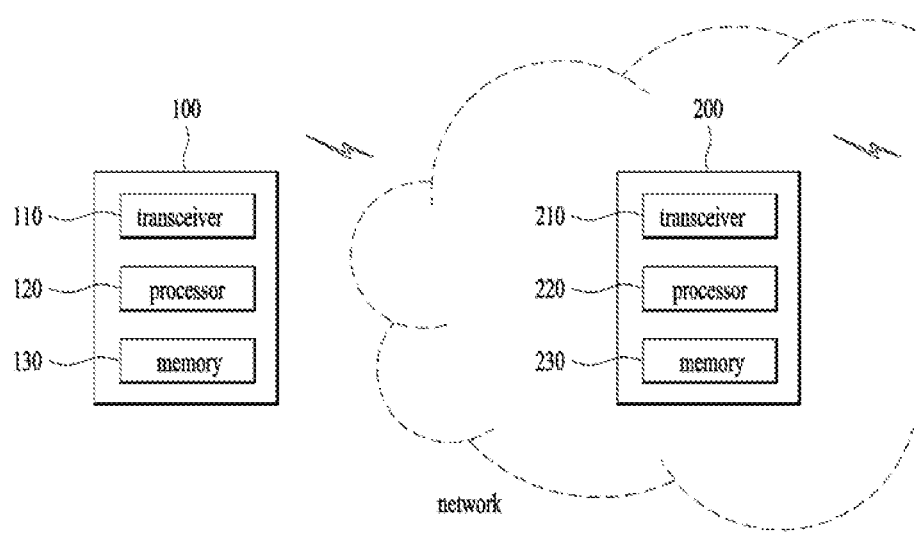
FIG. 13 is a diagram illustrating a configuration of a node device according to the embodiment of the present invention.

FIG. 13 is a diagram illustrating configurations of a UE and a network node device according to one embodiment of the present invention.

Referring to FIG. 13, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 13, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to perform a function of operation-processing information to be transmitted to and received from the external device. Also, the processor 220 may be configured to perform a network node operation suggested in the present invention. The memory 230 may store the operation-processed information for a predetermined time, and may be replaced with a buffer (not shown).

Also, the details of the aforementioned UE 100 and the aforementioned network node device 200 may be configured in such a manner that the aforementioned various embodiments of the present invention may independently be applied to the aforementioned UE 100 and the aforementioned network node device 200, or two or more embodiments may simultaneously be applied to the aforementioned UE 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

INDUSTRIAL APPLICABILITY

Although the aforementioned various embodiments of the present invention have been described based on the 3GPP system, the aforementioned embodiments may be applied to various mobile communication systems.

The invention claimed is:

1. A method for transmitting a session initiation protocol (SIP) message by a user equipment (UE) in a wireless communication system, the method comprising:
   establishing, by the UE which is out-coverage, a connection with a UE-to-network relay;
   receiving an E-UTRAN (evolved-UMTS terrestrial radio access network) Cell Global Identifier (ECGI) from the UE-to-network relay;
   comparing a first PLMN (public land mobile network) ID prior to connection with the UE-to-network relay with a second PLMN ID identified by the ECGI;
   selecting an address of a proxy call session control function (P-CSCF) by considering a PLMN change, wherein the address is a first address of a first P-CSCF when the first PLMN ID is different from the second PLMN ID, and the address is a second address of a second P-CSCF when the first PLMN ID is same with the second PLMN ID; and
   transmitting, by the UE, the SIP message to the P-CSCF having the selected address through the UE-to-network relay,
   wherein the first address is received through a DHCP (Dynamic Host Configuration Protocol) message from the UE-to-network relay which performs a function of the DHCP server, and the second address is an address used in-coverage.

2. The method according to claim 1, wherein the DHCP message is a DHCP offer or DHCP ack.

3. The method according to claim 1, wherein the P-CSCF address is P-CSCF of a home network of the UE-to-network relay if the UE-to-network relay performs a packet data network (PDN) connection in a HR (Home-Routed) mode, and is P-CSCF of a visited network of the UE-to-network relay if the UE-to-network relay forms a PDN connection in a LBO (Local Breakout) mode.

4. The method according to claim 1, wherein the UE uses the P-CSCF address stored therein if PLMN prior to connection with the UE-to-network relay is the same as PLMN of the UE-to-network relay.

5. The method according to claim 1, wherein the P-CSCF address is one of IPv4 address, IPv6 address and FQDN (Fully Qualified Domain Name).

6. The method according to claim 1, wherein the SIP message is a SIP register message.

7. A user equipment (UE) which is out-coverage for transmitting a session initiation protocol (SIP) message in a wireless communication system, the UE comprising:
   a transceiver; and
   a processor operatively coupled with the transceiver,
   wherein the processor establishes a connection with a UE-to-network relay, receives E-UTRAN (evolved-UMTS terrestrial radio access network) Cell Global Identifier (ECGI) from the UE-to-network relay, compares a first PLMN (public land mobile network) ID prior to connection with the UE-to-network relay with a second PLMN ID identified by the ECGI, selects an address of a proxy call session control function (P-CSCF) by considering a PLMN change, wherein the address is a first address of a first P-CSCF when the first PLMN ID is different from the second PLMN ID, and the address is a second address of a second P-CSCF when the first PLMN ID is same with the second PLMN ID, and transmits the SIP message to the P-CSCF having the selected address through the UE-to-network relay, and the P-CSCF corresponds to a P-CSCF address acquired through the UE-to-network relay or a P-CSCF address stored in the UE,
   wherein the first address is received through a DHCP (Dynamic Host Configuration Protocol) message from the UE-to-network relay which performs a function of the DHCP server, and the second address is an address used in-coverage.

* * * * *